United States Patent Office 3,024,257
Patented Mar. 6, 1962

3,024,257
STABLE PREPARATIONS OF ALKALI METAL SALTS OF ESTRONE SULFATE
John F. Millar, Baie d'Urfe, Quebec, and Lloyd E. Findlay, Ville La Salle, Quebec, Canada, assignors to Charles E. Frosst & Co., Montreal, Quebec, Canada, a corporation of Quebec
No Drawing. Filed Apr. 10, 1961, Ser. No. 101,639
3 Claims. (Cl. 260—397.4)

The present invention relates to the stabilization of synthetic sodium or potassium estrone sulfate.

It is known that the water-soluble sodium salt of estrone sulfate possesses considerable commercial importance as a component of the estrogenic principles extracted from the urine of pregnant mares. It is also known that sodium estrone sulfate, as present in extracts of urine of pregnant mares, retains its stability under ordinary conditions of storage, almost indefinitely. Such extracts find extensive use in pharmaceutical preparations. It is further known that synthetic sodium or potassium estrone sulfate is unstable and cannot be stored in a dry state because it decomposes spontaneously after a short time with loss of water solubility due to liberation of estrone and sodium or potassium acid sulfate.

Attempts have been made previously to provide stabilized estrone sulfate by preparing salts other than the sodium or potassium salts. For example, salts with piperidine and with quaternary ammonium bases have been described but no means to stabilize sodium estrone sulfate itself, has, up to the present time, been disclosed. While certain of these salts of organic bases do, in fact, exhibit stable properties, they are not, however, the natural form of the hormone and are, for the most part, water-insoluble.

Hence, it is highly desirable and is a particular object of this invention to provide a means whereby the sodium or potassium salts of synthetic estrone sulfate may be stabilized for use in pharmaceutical preparations, either alone, or in combination with other drugs.

In accordance with the present invention, it was discovered unexpectedly that the sodium or potassium salts of synthetic estrone sulfate are stable when admixed with N-methylglucamine. The novel preparation of the present invention provides the advantage that estrone sulfate can now be administered as such in the form of its highly desirable sodium or potassium salts rather than in the form of its organic salts as was heretofore the practice.

The stabilized composition of the present invention may be obtained by preparing an intimate mixture of sodium or potassium estrone sulfate with N-methylglucamine, in a ratio of at least one part of N-methylglucamine to 10 parts of the alkali metal salt of estrone sulfate, with a preferred ratio being one part of the amine to two parts of estrone sulfate salt. The mixture may be prepared from the crystalline solids or with the aid of a mutual solvent.

If desired, the stable alkali metal salt of estrone sulfate preparation of the present invention may be diluted with a non-toxic carrier which may be either solid or liquid to form pharmaceutical dosage forms.

The compositions may take the form of tablets, capsules, powders, solutions or other forms suitable for oral ingestion, tablets, capsules, powders or suppositories for insertion into a body cavity or sterile solutions for parenteral use.

In the dry form the mixture of sodium or potassium estrone sulfate may be mixed with solid diluents such as cornstarch, mannitol, calcium carbonate, talc, gums, magnesium stearate and the like. The mixture may also be employed in the form of a suspension in an inert liquid in which it is not soluble.

The present invention is illustrated in the following examples:

EXAMPLE I 1 gram of sodium estrone sulfate is triturated with 0.5 gm. of N-methylglucamine and the resultant mixture is passed through a 100 mesh stainless steel sieve. This forms a stable powder containing 66.6% sodium estrone sulfate.

EXAMPLE II 1 gram of sodium estrone sulfate and 0.5 gm. of N-methylglucamine are dissolved in 25 ml. of methanol. The solvent is evaporated and the resultant crystalline mixture is powdered to form a stable powder containing 66.6% sodium estrone sulfate.

EXAMPLE III 1 gram of sodium estrone sulfate and 0.25 gm. of N-methylglucamine are dissolved in 25 ml. of methanol. The solvent is evaporated and the resultant crystalline mixture was powdered to form a stable powder containing 80% sodium estrone sulfate.

EXAMPLE IV 1 gram of sodium estrone sulfate and 0.5 gm. of N-methylglucamine are dissolved in 20 ml. of methanol at 50° C. The solution is mixed with 38.5 gm. of powdered mannitol. The solvent is evaporated and the resultant crystalline mixture passed through a 60 mesh stainless steel sieve to form a stable powder containing 2.5% sodium estrone sulfate.

EXAMPLE V

To prepare a parenteral solution, 0.625 gm. of the composition of Example I is dissolved in sufficient freshly distilled water to make a total volume of 1000 cc. The solution is filtered through a fine porosity sintered glass funnel and filled into 1 cc. glass ampoules. The ampoules are sealed and heat-sterilized. Each ampoule contains 0.625 mgm. per cc. of sodium estrone sulfate.

EXAMPLE VI 30 grams of the powder composition of Example IV are mixed with 24 gm. of calcium carbonate, 16 gm. of powdered cellulose and 19 gm. of corn starch.

This mixture is formed into 20 mesh granules using conventional methods known in the art and blended with 1 gm. of finely powdered magnesium stearate as a lubricant.

This prepared granulation is compressed to form 600 tablets each weighing 0.15 gm. and containing 1.25 mgm. of sodium estrone sulfate.

The stability of sodium estrone sulfate in the composition of the present invention was evaluated under accelerated aging conditions as shown in the following tests wherein samples were stored at 70° C. and 45° C. and the content of sodium estrone sulfate was determined before and after storage. Table I shows the amount of sodium estrone sulfate remaining in each sample after the specified storage period, as compared to the initial amount.

As can be seen from the following results in Table I, the control degraded very rapidly whereas the preparation of sodium estrone sulfate, stabilized in accordance with the present invention, was unexpectedly found to have high stability.

Table I

[Percent]

| | Storage temperature and time | | | |
|---|---|---|---|---|
| | 70° C. | | 45° C. | |
| | 2 weeks | 3 weeks | 2 weeks | 12 weeks |
| Control (crystalline sodium estrone sulfate) | 42 | 15 | 78 | 0 |
| Example I | 100 | 96.5 | 100 | |
| Example II | 100 | 100 | 100 | 98 |
| Example III | 98 | 97.4 | | 91.5 |
| Example IV | 100 | 100 | 100 | 99 |
| Example VI | 99 | 98 | 100 | 96.5 |

We claim:

1. A dry stable preparation of synthetic alkali metal salt of estrone sulfate comprising a mixture of an alkali metal estrone sulfate selected from the group consisting of sodium and potassium estrone sulfate, and N-methylglucamine, the N-methylglucamine being present in a ratio of at least one part of N-methylglucamine to 10 parts of alkali metal salt of estrone sulfate.

2. A dry stable preparation of synthetic sodium estrone sulfate comprising a mixture of sodium estrone sulfate and N-methylglucamine, the N-methylglucamine being present in a ratio of at least one part of N-methylglucamine to 10 parts of sodium estrone sulfate.

3. A dry stable preparation of synthetic potassium estrone sulfate comprising a mixture of potassium estrone sulfate and N-methylglucamine, the N-methylglucamine being present in a ratio of at least one part of N-methylglucamine to 10 parts of potassium estrone sulfate.

References Cited in the file of this patent

UNITED STATES PATENTS

| 2,534,121 | Grant et al. | Dec. 12, 1950 |
| 2,828,306 | Griebsch et al. | Mar. 25, 1958 |